United States Patent
Su et al.

(10) Patent No.: US 7,623,941 B2
(45) Date of Patent: Nov. 24, 2009

(54) METHOD FOR ADJUSTING THE RELATIVE POSITION OF DEVICE OF LASER ENGRAVER

(75) Inventors: Tsun-Yau Su, Hsi Chih (TW); Tsung-I Chen, Hsi Chih (TW); Hsing-Hsien Kuo, Hsi Chih (TW)

(73) Assignee: Great Computer Corporation, Taipei Hsien (TW)

( * ) Notice: Subject to any disclaimer, the term of this patent is extended or adjusted under 35 U.S.C. 154(b) by 183 days.

(21) Appl. No.: 11/798,049

(22) Filed: May 9, 2007

(65) Prior Publication Data

US 2008/0281460 A1   Nov. 13, 2008

(51) Int. Cl.
*G06F 19/00* (2006.01)
*B23K 26/36* (2006.01)

(52) U.S. Cl. .................................. 700/166; 219/121.68

(58) Field of Classification Search ................. 700/166; 219/121.68, 121.69, 121.83; 400/129
See application file for complete search history.

(56) References Cited

U.S. PATENT DOCUMENTS

| | | | |
|---|---|---|---|
| 7,177,008 B2 * | 2/2007 | Nishi et al. | 355/53 |
| 7,256,869 B2 * | 8/2007 | Nishi | 355/53 |
| 7,265,316 B2 * | 9/2007 | Kaplan et al. | 219/121.68 |
| 2007/0086822 A1 * | 4/2007 | Sato | 400/129 |
| 2007/0109515 A1 * | 5/2007 | Nishi | 355/53 |
| 2007/0274559 A1 * | 11/2007 | Depta et al. | 382/100 |

* cited by examiner

*Primary Examiner*—Ramesh B Patel
*Assistant Examiner*—Douglas S Lee
(74) *Attorney, Agent, or Firm*—Muncy, Geissler Olds & Lowe, PLLC

(57) ABSTRACT

A method for adjusting the relative position of devices of a laser engraver. The method includes an outputting device of the laser engraver to forms a marked point on a non-working piece. Let the outputting device position the center of the marked point and record it. Then an image sensing device of the laser engraver is moved to the marked point and seeks the center of the marked point. Then, the position point that the outputting device is located is recorded after the outputting device moved according to the movement of the image sensing device. Finally, calculating the distance between the center recorded by the outputting device and the position point recorded after the outputting device moved to obtain the precise distance between the image sensing device and the outputting device.

3 Claims, 1 Drawing Sheet

METHOD FOR ADJUSTING THE RELATIVE POSITION OF DEVICE OF LASER ENGRAVER

FIELD OF THE INVENTION

The present invention is related to a method for adjusting the relative position of devices of a laser engraver, and particularly to a method for obtaining effective and precise distance between an image sensing device and an outputting device of a laser engraver to adjust the position error by the correspondence between the image sensing device and the outputting device. It is applicable to adjustment before the laser engraver leaving the factory or before first use of users.

DESCRIPTION OF THE PRIOR ART

The procedure of the laser engraving is as simple as that of printing on paper by the computer and the printer. Any well-edited figure could be "printed" to engravers easily by computers. The only different part is that the printing is to apply the toner to paper and the laser engraving is to output laser to work-pieces, such as wood, acrylic, plastic board, metal board and stone board, to complete carving process.

At present, according to the structure of the laser engraver, a laser outputting device and an image sensing device, such as the charge coupled device (CCD), are connected to the same frame to let the outputting device and the image sensing device have synchronous position. However, for the sake of the error of assembly or the shake during transfer or use, the outputting device and the image sensing device must be adjusted to raise accuracy of outputting device carving before processing carving. Prior method is to print a base point by a printer and then measure the actual cutting error to compensate correction value to the computer and adjust it. But this process adjusted by manpower is complicated and the accuracy of cutting by outputting device after adjustment is not as precise as predicted.

SUMMARY OF THE INVENTION

The primary object of the present is to provide a method for obtaining the distances between the image sensing device and the outputting device rapidly, effectively and accurately to adjust the relative position of devices of a laser engraver.

To achieve the above object, a method for adjusting the relative position of devices of a laser engraver according to the present invention is to render an outputting device of the laser engraver form a marked point on a non-working piece. Let the outputting device positions the center of the marked point and records it. Then an image sensing device of the laser engraver is moved to the marked point and seeks the center of the marked point. Then, the position point that the outputting device is located is recorded after the outputting device moved according to the movement of the image sensing device. Finally, calculating the distance between the center recorded by the outputting device and the position point recorded after the outputting device moved to obtain the precise distance between the image sensing device and the outputting device.

DETAILED DESCRIPTION OF THE PREFERRED EMBODIMENT

Figure 1:
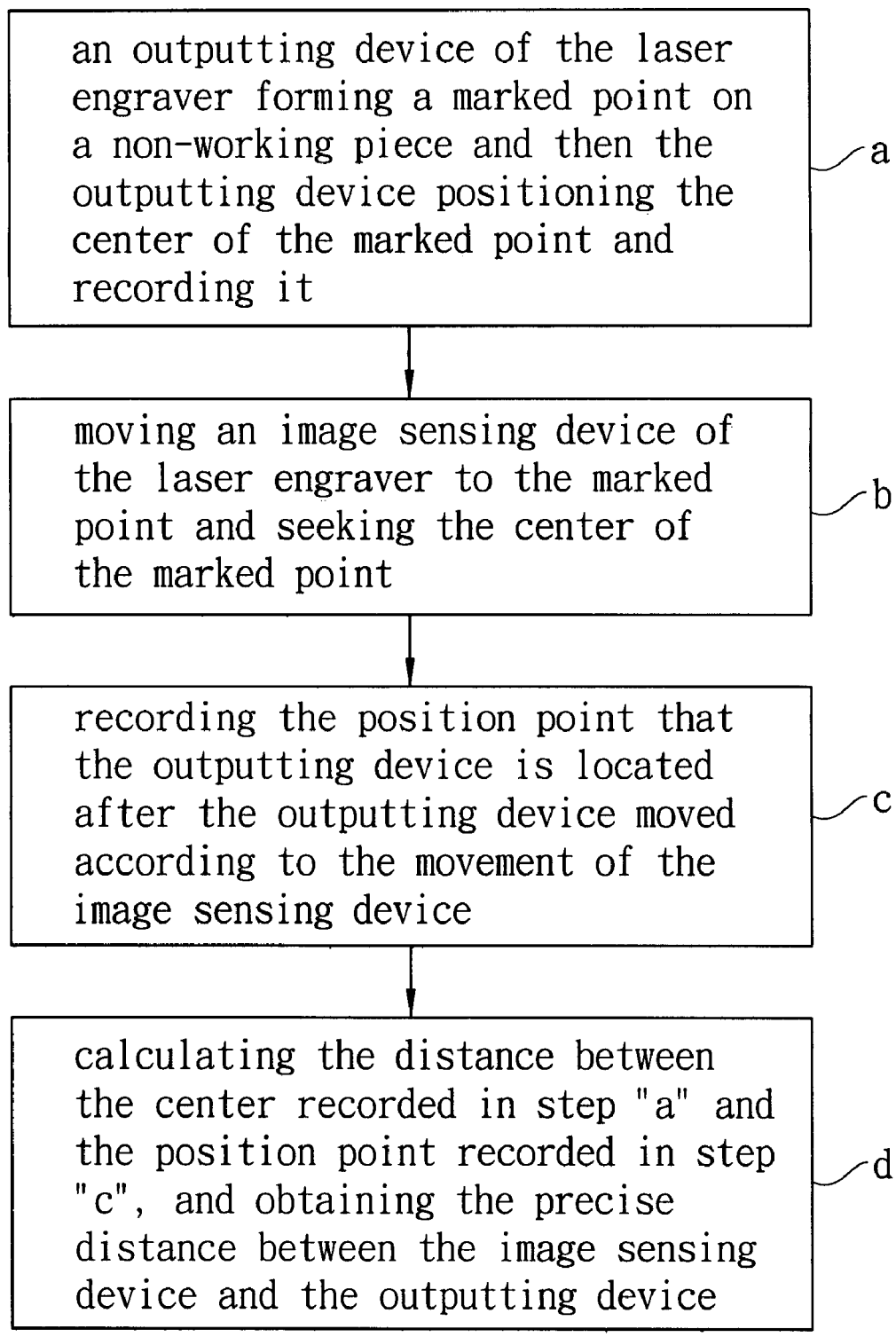
FIG. 1 is a block diagram of a method for adjusting the relative position of devices of a laser engraver according to the present invention.

Referring to FIG. 1, it illustrates an embodiment of the block diagram of a method for adjusting relative position of the devices of a laser engraver according to the present invention, which comprises the following steps:

a. an outputting device of the laser engraver forming a marked point on a non-working piece and the outputting device positioning the center of the marked point and record it, wherein the image sensing device is the charge coupled device (CCD);

b. moving an image sensing device of the laser engraver to the marked point and seeking the center of the marked point;

c. recording the position point that the outputting device is located after the outputting device moved according to the movement of the image sensing device; and d. calculating the distance between the center recorded in step "a" and the position point recorded in step "c", and obtaining the precise distance between the image sensing device and the outputting device.

Wherein, the record and distance calculation of the marked point and the position point are processed by the central processing unit built in the laser engraver.

Thus, before the laser engraver leaving the factory or before first use, the users could render the outputting device of the laser engraver move to a non-working piece and form a marked point on the non-working piece. And the center of the marked point is positioned by moving the outputting device and recording the location of the center, e.g. (0, 0), through the central processing unit of the laser engraver. Then the image sensing device of the laser engraver is moved to the above marked point and locates the center of the marked point (0, 0) by the central processing unit of the laser engraver. Because the outputting device and the image sensing device are both connected to the same frame, the outputting device and the image sensing device could have synchronous position. Thus, due to the movement of the image sensing device, the outputting device would relatively move to a location, e.g. (10, 10), and be recorded the position point that outputting device is located. Finally, the central processing unit could calculate the distance between the center of the marked point (0, 0) and position point (10, 10) after the outputting device is moved. The accurate distance between the image sensing device and the outputting device is obtained.

Thus, before carving, the tolerance produced by the assembly, operation or transferring of the image sensing device or outputting device could be calibrated. And the method according to the present invention could obtain the distance between the image sensing device and the outputting device effectively and accurately by the movement and the positioning to improve the carving accuracy of the outputting device.

The foregoing description of the preferred embodiments of this invention has been presented for purposes of illustration and description. It is not intended to be exhaustive or to limit the invention to the precise form disclosed, and many modifications and variations may be apparent to a person skilled in the art are intended to be included within the scope of this invention.

As stated in the above disclosed, the present invention can surely achieve its expected objects to provide a method for adjusting the relative position of devices of a laser engraver. It is new and can be put into industrial use.

What is claimed is:

1. A method for adjusting a relative position between an outputting device and an image sensing device of a laser engraver, comprising the following steps:

a. forming a marked point on a non-working piece by the outputting device, moving the outputting device to a center of the marked point and recording a position of the center of the marked point;
b. moving the image sensing device to the center of the marked point;
c. recording a position point that the outputting device is located after the outputting device being concurrently moved according to the motion of the image sensing device in step "b"; and
d. calculating a distance between the center of the marked point recorded in step "a" and the position point of the outputting device recorded in step "c" to obtain the precise distance between the image sensing device and the outputting device, wherein the outputting device and the image sensing device are both connected to a frame to synchronize movement of the outputting device and the image sensing device.

2. The method as claimed in claim 1, wherein the recording and distance calculation between the center of the marked point and the position point of the outputting device are processed by a central processing unit built in the laser engraver.

3. The method as claimed in claim 1, wherein the image sensing device is the charge coupled device (CCD).

* * * * *